: United States Patent (10) Patent No.: US 12,181,486 B2
Imaeda et al. (45) Date of Patent: Dec. 31, 2024

(54) PLATE CHANGER FOR AUTO-SAMPLER

(71) Applicant: Shimadzu Corporation, Kyoto (JP)

(72) Inventors: Kodai Imaeda, Kyoto (JP); Takuya Sawada, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 959 days.

(21) Appl. No.: 17/275,792

(22) PCT Filed: Sep. 13, 2018

(86) PCT No.: PCT/JP2018/034027
§ 371 (c)(1),
(2) Date: Mar. 12, 2021

(87) PCT Pub. No.: WO2020/054033
PCT Pub. Date: Mar. 19, 2020

(65) Prior Publication Data
US 2022/0050122 A1 Feb. 17, 2022

(51) Int. Cl.
G01N 35/04 (2006.01)
G01N 30/24 (2006.01)

(52) U.S. Cl.
CPC .............. *G01N 35/04* (2013.01); *G01N 30/24* (2013.01); *G01N 2035/0425* (2013.01)

(58) Field of Classification Search
CPC ............... B01L 9/523; B01L 2200/025; B01L 2200/18; G01N 35/0099; G01N 35/04; G01N 2035/00039; G01N 2035/0425
See application file for complete search history.

(56) References Cited

U.S. PATENT DOCUMENTS

| 4,676,951 | A | * | 6/1987 | Armes | G01N 35/00 422/65 |
| 5,266,272 | A | * | 11/1993 | Griner | G01N 35/04 422/65 |
| 6,228,636 | B1 | | 5/2001 | Yahiro et al. | |

FOREIGN PATENT DOCUMENTS

JP 2005073623 A 3/2005

OTHER PUBLICATIONS

Office Action dated Jun. 15, 2022 for corresponding application JP 2020-546634, submitted with a machine translation.
(Continued)

*Primary Examiner* — Matthew D Krcha
*Assistant Examiner* — Austin Q Le
(74) *Attorney, Agent, or Firm* — Muir Patent Law, PLLC

(57) ABSTRACT

A plate changer is provided with a plate storage and a transport mechanism. The plate storage is provided with an installation window portion and a transport window portion arranged to face to each other. The plate storage is further provided with a plate stopper at the transport window portion. The plate stopper stops the sample plate by being arranged at an interfering position where the plate stopper comes into contact with a transport window portion-side end face of the sample plate when the sample plate inserted from the installation window portion has reached a predetermined position in the one direction. The the plate stopper is configured to be arranged at a non-interfering position where the plate stopper does not interfere with the transport mechanism and the sample plate when the sample plate on the plate installation stand is taken out from the transport window portion by the gripping portion.

9 Claims, 4 Drawing Sheets

(56) References Cited

OTHER PUBLICATIONS

Notice of Reasons for Refusal for corresponding Japanese Patent Application No. JP 2020-546634, dated Dec. 23, 2021, submitted with a machine translation.
International Search Report for PCT application No. PCT/JP2018/034027 dated Nov. 13, 2018, submitted with a machine translation.

\* cited by examiner

PLATE CHANGER FOR AUTO-SAMPLER

TECHNICAL FIELD

The present invention relates to a plate storage for storing a plurality of sample plates for holding a sample to be analyzed by an analysis device, such as, e.g., a liquid chromatograph, and a plate changer having a transport mechanism configured to take out an arbitrary sample plate stored in the plate storage.

BACKGROUND OF THE INVENTION

In a liquid chromatograph analysis, in some cases, an auto-sampler is used to inject a plurality of samples into analytical channels of a liquid chromatograph. The auto-sampler is configured such that a sample plate holding a plurality of sample vials or sample themselves is installed at a predetermined place and the sample held by the sample plate is automatically collected and injected into the analytical channel of the liquid chromatograph (see Patent Document 1).

In a case where there are a large number of samples to be analyzed by a liquid chromatograph, a plate changer for automatically replacing a sample plate to be installed in an auto-sampler may be further used. A plate changer is provided with a plate storage for storing a plurality of sample plates and a transport mechanism for transporting the sample plate stored in the plate storage. The transport mechanism is configured to take out the sample plate from the plate storage, install the sample plate to the auto-sampler, and store the sample plate installed on the auto-sampler in the plate storage.

When the above-described plate changer is used, the user only requires to store a plurality of sample plates holding samples to be analyzed in the plate storage of the plate changer. Each sample plate stored in the plate storage by the user is sequentially transported to and installed in the auto-sampler by the transport mechanism, and the analysis of each sample is sequentially and automatically performed.

PRIOR ART DOCUMENT

Patent Document

Patent Document 1: Japanese Unexamined Patent Application Publication No. 2016-70695

SUMMARY OF THE INVENTION

Problems to be Solved by the Invention

In the above-described plate changer, the user inserts a sample plate from the front window portion (installation window portion) provided on the front side of the plate storage so that the sample plate is installed on the plate installation stand in the plate storage. At this time, a user may push the sample plate too far in the plate storage, causing the dropping of the sample plate from the plate installation stand. In order to prevent such a problem, it is conceivable to provide a stopper for preventing the falling of the sample plate on the backside of the plate storage. However, if such a stopper is provided, a transport mechanism and a sample plate interfere with the stopper when the transport mechanism takes out the sample plate in the plate storage, which hinders the take-out operation of the sample plate by the transport mechanism.

The present invention aims to prevent the falling of a sample plate when inserting the sample plate into a plate storage without causing a problem when taking out the sample plate from the plate storage by a transport mechanism.

Means for Solving the Problem

A plate changer for an auto-sampler according to the present invention is provided with a plate storage and a transport mechanism. The plate storage is provided with a plate installation stand for installing a sample plate in the plate storage, an installation window portion for installing the sample plate on the plate installation stand by inserting the sample plate in one direction within a horizontal plane, and a transport window portion for taking out the sample plate installed on the plate installation stand in the one direction, the transport window portion being provided on an opposite side across the installation window portion via the plate installation stand. The transport mechanism is provided with a gripping portion for gripping the sample plate. The transport mechanism is configured to transport the sample plate installed on the plate installation stand with the sample plate gripped by the gripping portion. Further, the plate storage is provided with a plate stopper. The plate stopper is configured to be arranged at an interfering position where the plate stopper comes into contact with a transport window portion-side end face of the sample plate when the sample plate inserted from the installation window portion has reached a predetermined position in the one direction to stop the sample plate. The plate stopper is configured to be arranged at a non-interfering position where the plate stopper does not interfere with the gripping portion and the sample plate when the sample plate on the plate installation stand is taken out from the transport window portion by the gripping portion.

In the preferred embodiment of the present invention, the plate stopper is provided with a vertical bar extending in a vertical direction and a rotating plate rotatable within a horizontal plane while holding one end of the vertical bar. The rotating plate is configured to rotate within the horizontal plane to move the vertical bar between the interfering position and the non-interfering position.

In the above-described case, the plate stopper may be provided with two rotating plates, and the rotating plates may hold an upper end and a lower end of the vertical bar, respectively.

The plate changer according to the present invention may be provided with an opening and closing door for opening and closing the installation window portion. In this case, when the sample plate is installed on the plate installation stand, the opening and closing door is opened. Thereafter, the opening and closing door is closed. That is, when the sample plate on the plate installation stand is taken out by the transport mechanism, it becomes a state in which the opening and closing door is closed. Therefore, the vertical bar of the plate stopper is preferably configured to be arranged at the interfering position when the opening and closing door is open and to be arranged at the non-interfering position when the opening and closing door is closed. With this, the vertical bar of the plate stopper is arranged at the non-interfering position when the sample plate on the plate installation stand is taken out by the transport mechanism, and therefore the vertical bar does not hinder the sample plate take-out operation by the transport mechanism.

As the mechanism for linking the opening and closing operation of the opening and closing door with the plate stopper, it may be configured such that the plate changer is further provided with a shaft that moves toward the transport window portion in conjunction with a closing operation of the opening and closing door, the shaft extending in the one direction, and the shaft moves toward the transport window portion when the opening and closing door is closed to push a portion of the rotating plate of the plate stopper to rotate the rotating plate so that the vertical bar is moved to the non-interfering position.

The rotating plate of the plate stopper is preferably biased in a direction in which the vertical bar is arranged at the interfering position by an elastic body. With this, the vertical bar is arranged at the interfering position unless an external force is applied to the rotating plate. Therefore, it is sufficient to apply an external force to the rotating plate only when placing the vertical bar to the non-interfering position. Thus, the mechanism for operating the plate stopper becomes simple.

One example of the elastic body is a torsion spring.

Further, in a preferred embodiment, the plate changer is further provided with a stopper for stopping a rotating motion of the rotating plate such that the vertical bar stops with the vertical bar arranged at the interfering position in a state in which the rotating plate is not pressed by the shaft.

Effects of the Invention

The plate changer for an auto-sampler according to the present invention is provided with a plate stopper. The plate stopper is configured to be arranged at an interfering position where the plate stopper comes into contact with the installation window portion-side end face of the sample plate when the sample plate inserted from the transport window portion has reached a predetermined position on the plate installation stand in the one direction to stop the sample plate. Therefore, it is possible to prevent the falling of the sample plate from the transport window portion when the sample plate is inserted from the installation window portion of the plate storage by pushing the sample plate too far. Further, it is configured such that the plate stopper is arranged at the non-interfering position where the plate stopper does not interfere with the gripping portion and the sample plate when the sample plate on the plate stand is taken out from the transport window portion by the gripping portion of the transport mechanism. Therefore, the transport mechanism does not hinder the take-out operation of the sample plate by the transport mechanism.

EMBODIMENTS FOR CARRYING OUT THE INVENTION

Hereinafter, an example of the plate changer of the present invention will be described with reference to the attached drawings.

Figure 1:
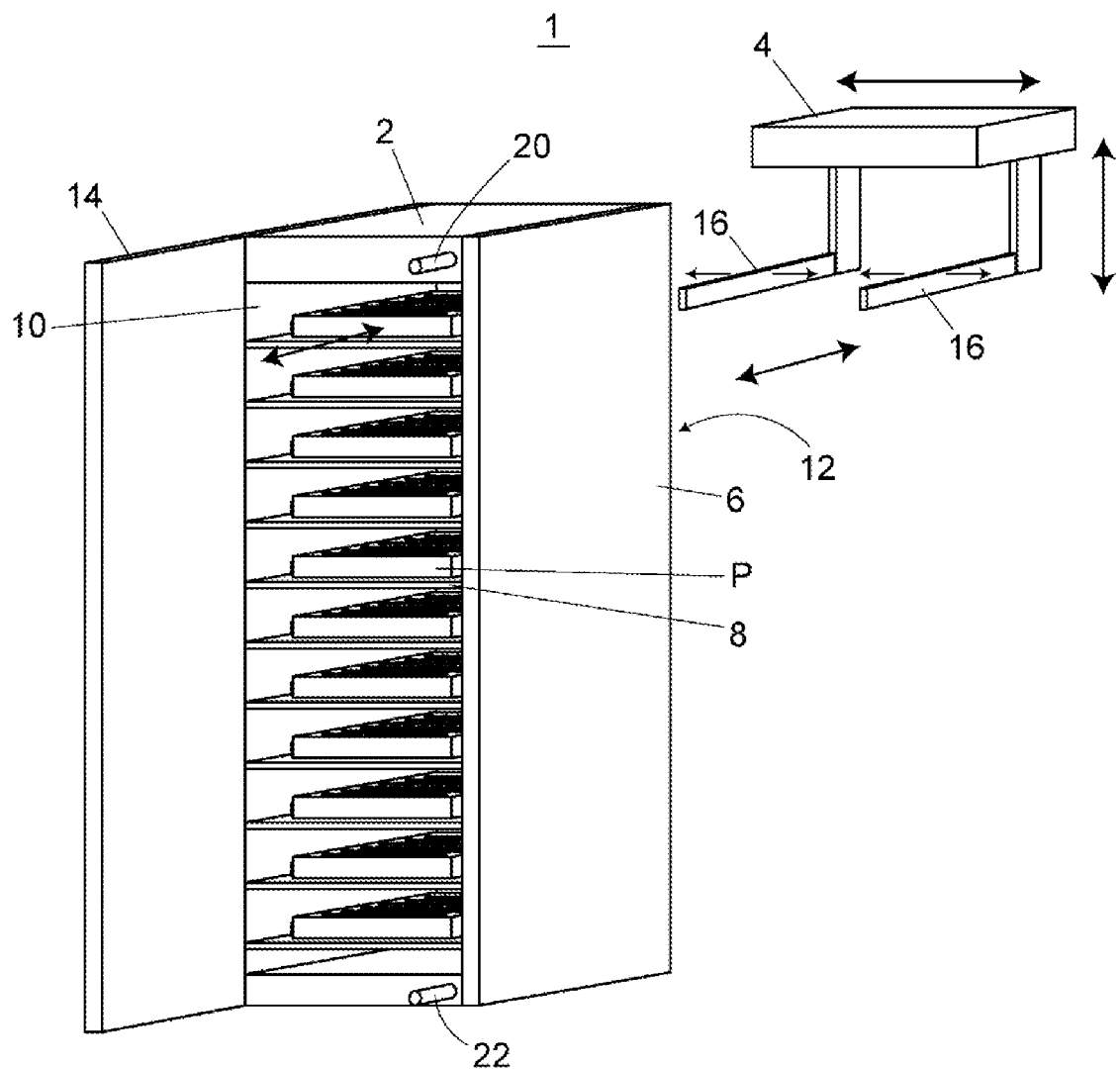
FIG. 1 is a perspective view of one example of a plate changer as viewed from the front side.

As shown in FIG. 1, the plate changer 1 is provided with a plate storage 2 and a transport mechanism 4. The plate storage 2 is for storing a plurality of sample plates P in a housing 6. The sample plate P may be any plate used for an auto-sampler of an analyzer, such as, e.g., a well plate having a plurality of wells on the upper surface for receiving a sample and a vial plate having a plurality of holes on the top surface for accommodating a plurality of sample vials containing a sample.

The plate storage 2 is provided with a plurality of plate installation stands 8 for installing the sample plates P. The plate installation stands 8 are arranged side by side in the vertical direction so that one sample plate P is installed on each plate installation stand 8. The plate storage 2 is provided with an installation window portion 10 on the front side and a transport window portion 12 on the rear side. The installation window portion 10 and the transport window portion 12 each are an opening provided at opposed facing positions of the housing 6.

The installation window portion 10 is for a user to install a sample plate P on a desired plate installation stand 8, or to take out the sample plate P installed on the plate installation stand 8. On the front face of the plate storage 2, an opening and closing door 14 for opening and closing the installation window portion 10 is provided. The installation of the sample plate P on the plate installation stand 8 is performed by sliding the sample plate P on the plate installation stand 8 in one direction within the horizontal plane indicated by the arrows in the drawing, i.e., in a direction from the installation window portion 10 side toward the transport window portion 12 side. The operation for taking out the sample plate P from the plate installation stand 8 is performed by sliding the sample plate P in a direction opposite to the direction at the time of the installation, i.e., in the direction from the transport window portion 12 side toward the installation window portion 10 side.

The transport window portion 12 is used when the transport mechanism 4 installs the sample plate P on a predetermined plate installation stand 8 or when the transport mechanism 4 takes out the sample plate P installed on the plate installation stand 8.

The transport mechanism 4 is moved in a horizontal plane direction and in a vertical direction on the rear side of the plate storage 2 by a drive mechanism (not shown). The transport mechanism 4 is provided with a pair of arms 16 horizontally extending in parallel to each other. The two arms 16 extend parallel to the slide direction of the sample plate P in the plate storage 2. The transport mechanism 4 is configured such that the distance between the two arms 16 can be adjusted variably so that the two arms 16 can sandwich the sample plate P to hold the side surfaces of the sample plate P. The two arms 16 constitute a gripping portion for gripping the side surfaces of the sample plate P.

The transport mechanism 4 inserts the two arms 16 from the transport window portion 12 side of the plate storage 2 into the plate storage 2, grasps the side surfaces of the sample plate P installed on the plate installation stand 8 in the plate storage 2, takes out the sample plate P from the plate storage 2 by sliding the sample plate P, and transports the sample plate P to a predetermined transport destination. The transport destination of the sample plate P is, for example, an auto-sampler used for a liquid chromatograph. Further, the transport mechanism 4 transports the sample plate P in which the sample processing has been completed to the plate storage 2 and inserts the sample plate P from the transport window portion 12 to install the sample plate P on a predetermined plate installation stand 8 in the plate storage 2.

Although not described in detail in this example, the plate storage 2 may be provided with a temperature control mechanism (not shown), such as, e.g., a heater and a Peltier element for adjusting the temperature of the sample plate P stored in the housing 6 to a predetermined temperature.

Figure 2:
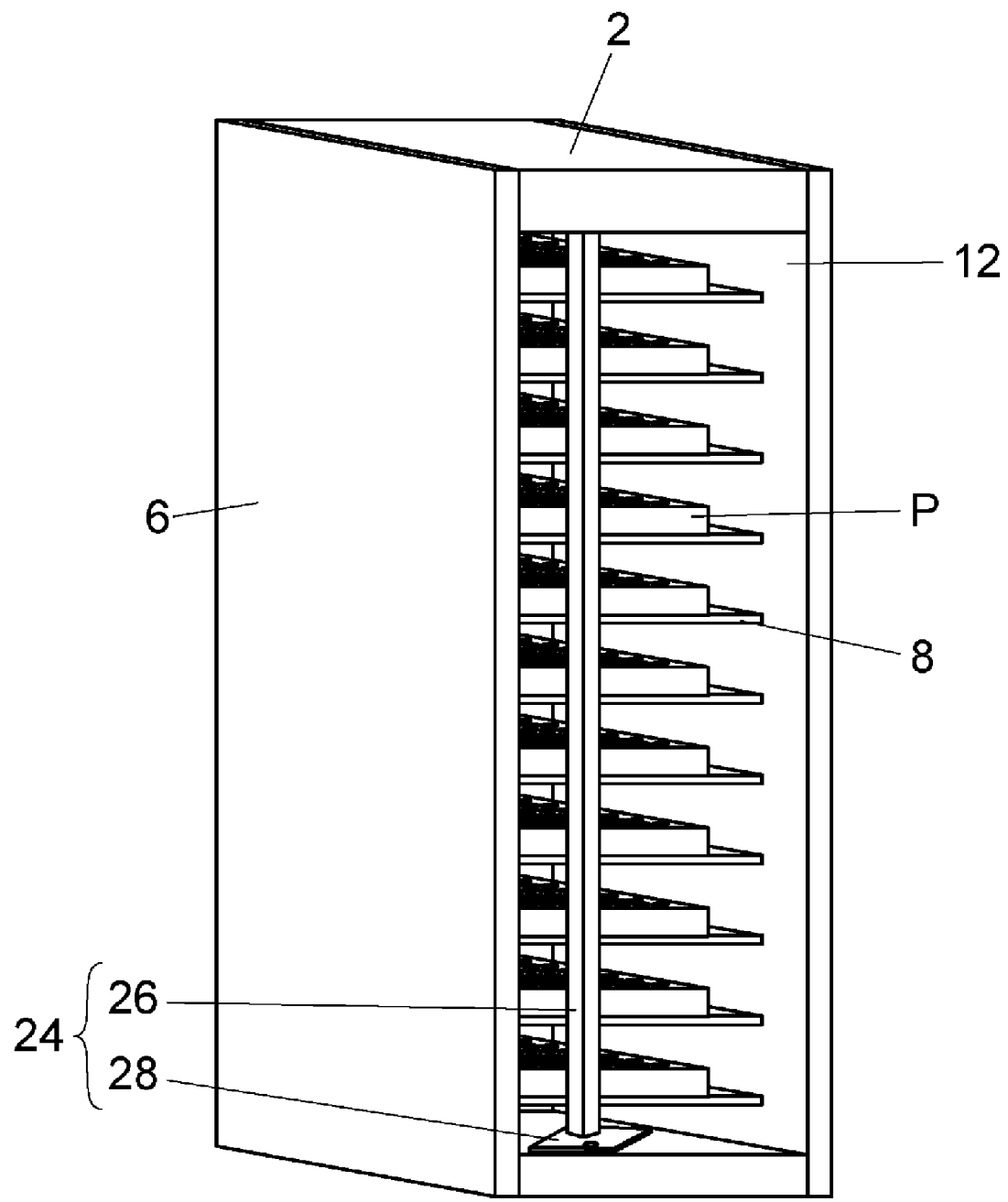
FIG. 2 is a perspective view of a plate storage of the plate changer of the example as viewed from the rear side.

As shown in FIG. 2, the plate storage 2 is provided with a plate stopper 24 at the transport window portion 12. The plate stopper 24 is configured to prevent the falling of the sample plate P from the plate installation stand 8 by coming into contact with the end face of the transport window portion 12 side of the sample plate P when the sample plate P is inserted from the installation window portion 10 on the plate installation stand 8. The plate stopper 24 is configured by a vertical bar 26 extending in a vertical direction between the upper end and the lower end of the plate storage 2 and rotating plates 28 rotatable within a horizontal plane (in FIG. 2, only the lower end side rotating plate 28 is shown). The rotating plates 28 are provided at the upper end and the lower end of the plate storage 2 to hold the upper end and the lower end of the vertical bar 26 provided on the upper end and the lower end of plate storage 2, respectively.

The plate stopper 24 is configured such that the vertical bar 26 is moved in conjunction with the opening and closing operation of the opening and closing door 14 of the installation window portion 10 of the plate storage 2. At the upper end portion and the lower end portion of the plate storage 2, shafts 20, 22 (see FIG. 1) extending from the installation window portion 10 to the transport window portion 12 (see FIG. 1) in the horizontal direction is provided. In a state in which the installation window portion 10 of the opening and closing door 14 is open (the state of FIG. 1), the end of the shaft 20, 22 of the installation window portion 10 side protrudes to the front side of the plate storage 2. Thus, when the opening and closing door 14 is closed, the shaft 20, 22 is pushed to be moved toward the transport window portion 12 side by the opening and closing door 14 to thereby arrange the vertical bar 26 to a position different from the position when the opening and closing door 14 is opened.

The vertical bar 26 of the plate stopper 24 is arranged at the position (hereinafter referred to as "interfering position") where the plate stopper 24 is in contact with the transport window portion 12 side end face of the sample plate P inserted up to a predetermined position on the plate installation stand 8 when the opening and closing door 14 of the installation window portion 10 is open. On the other hand, the vertical bar 26 is arranged at the position (hereinafter referred to as "non-interfering position") where the vertical bar 26 does not interfere with the operation of the arms 16 of the transport mechanism 4 attempting to take out the sample plate P from the plate installation stand 8 when the opening and closing door 14 is closed.

Figure 3:
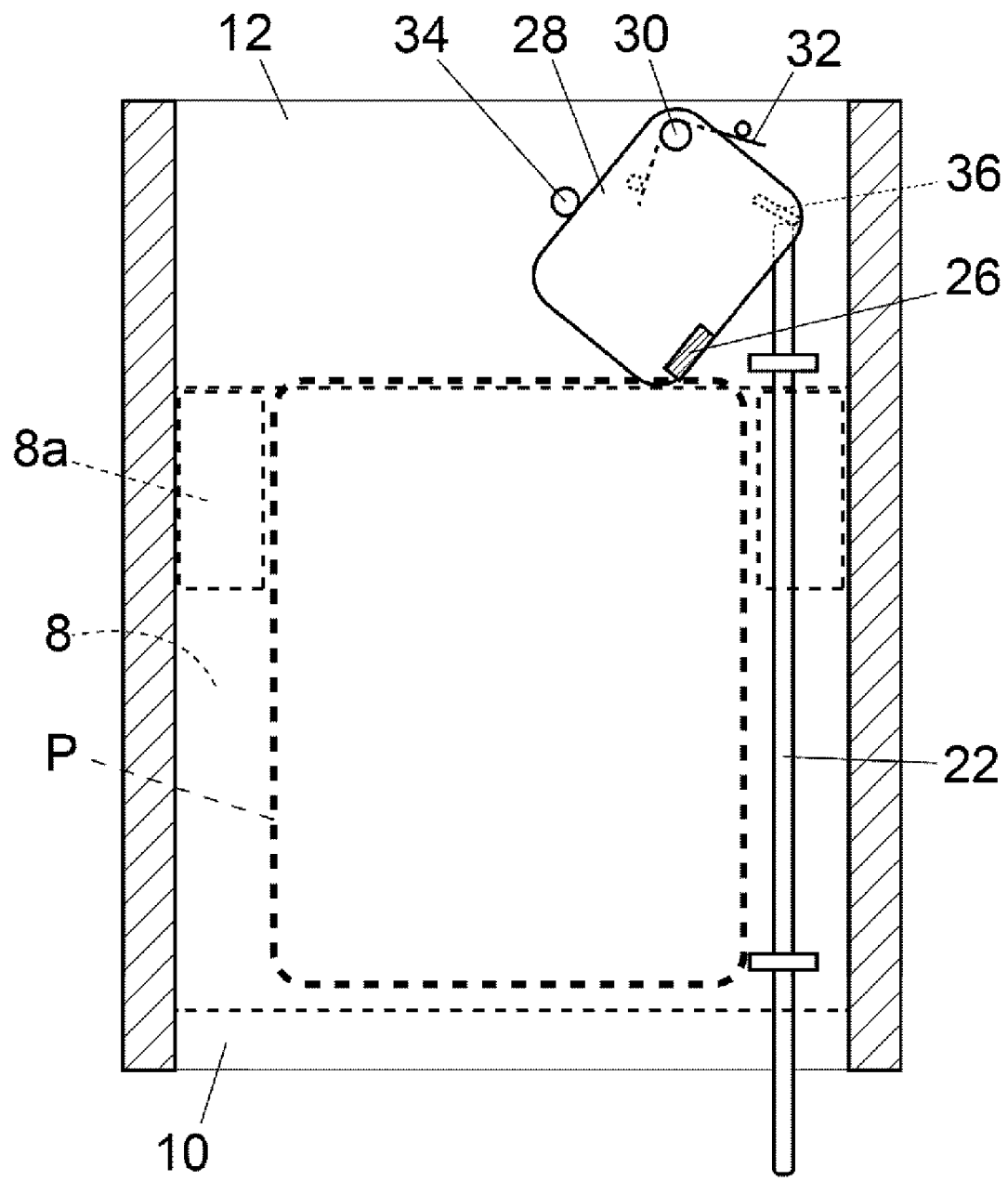
FIG. 3 is a cross-sectional view of the plate storage as viewed from above the mechanism for moving the plate stopper in which the opening and closing door is open.
Figure 4:
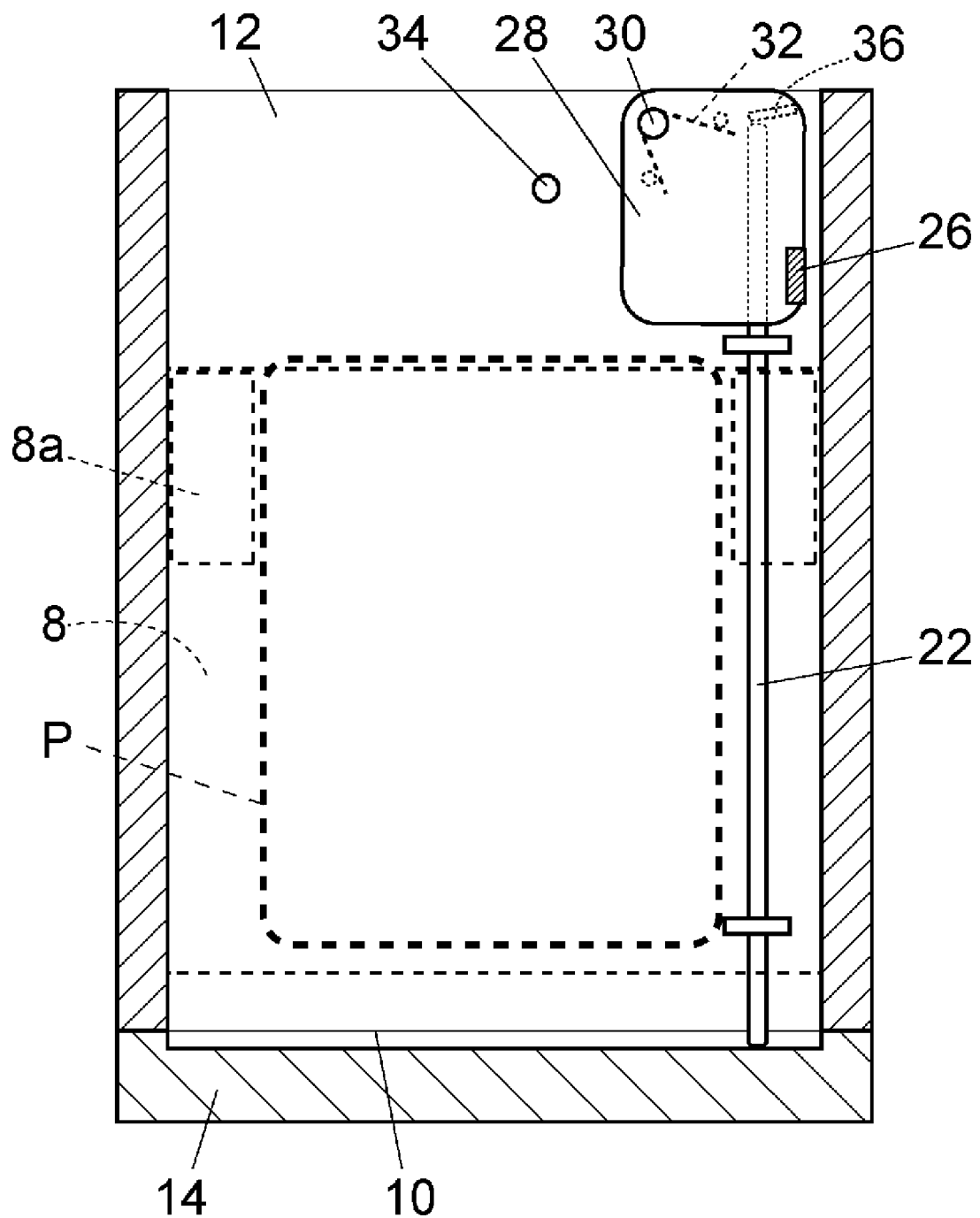
FIG. 4 is a cross-sectional view of the plate storage as viewed from above the mechanism for moving the plate stopper in which the opening and closing door is closed.

Referring to FIG. 3 and FIG. 4, the operation principle of the plate stopper 24 will be described. Note that in FIG. 3 and FIG. 4, although the structure of the lower end portion side of the plate storage 2 is shown, the structure of the upper end portion side of the plate storage 2 is the same.

The rotating plate 28 holding the vertical bar 26 is rotatable within a horizontal plane by a shaft 30. A torsion spring 32 that is an elastic body is attached to the shaft 30 so that the rotating plate 28 is biased by the torsion spring 32 in the direction of placing the vertical bar 26 to the interfering position (in the clockwise direction in the drawing). On the floor where the rotating plate 28 is arranged, there is provided a stopper 34 for stopping the rotation of the rotating plate 28 at the position where the vertical bar 26 is positioned at the interfering position. With this, in a state in which no external force is applied to the rotating plate 28, that is, in a state in which the opening and closing door 14 is open (the state of FIG. 3), the vertical bar 26 is always arranged at the interfering position. Thus, when the sample plate P inserted from the installation window portion 10 on the plate installation stand 8 has reached the predetermined position, the vertical bar 26 interferes with the sample plate P. Thus, the sample plate P is prevented the falling on the transport window portion 12 side (upper side in the drawing).

Note that the reference numeral 8a shown by a broken line denotes a plate guide provided to the plate installation stand 8. The plate guide 8a is for supporting both side surfaces of the sample plate P so that the sample plate P inserted from the installation window portion 10 is positioned in the correct posture. The plate guide 8a is configured to move to a position where the plate guide 8a does not interfere with the operation of the arm 16 by coming into contact with the arm 16, for example, a position below the upper surface of the plate installation stand 8, when the arm 16 of the transport mechanism 4 (see FIG. 1) has entered from the transport window portion 12 above the plate installation stand 8 to take out the sample plate P.

The rotating plate 28 is provided with a shaft contact portion 36 which is always in contact with the end of the shaft 22 on the transport window portion 12 side. As shown in FIG. 4, when the opening and closing door 14 of the installation window portion 10 is closed, the shaft 22 is moved toward the transport window portion 12 side (upper side in the drawing) by the opening and closing door 14 when the opening and closing door 14 of the installation window portion 10 is closed. Thus, the shaft contact portion 36 is pushed and moved toward the transport window portion 12 side by the shaft 22. With this, the rotating plate 28 is rotated so that the vertical bar 26 is moved to a position near the side surface in the plate storage 2, i.e., the non-interfering position. The position of the vertical bar 26 at this time is a position where the vertical bar 26 does not interfere with the operation of the arm 16 of the transport mechanism 4 attempting to take out the sample plate P from the plate storage 2 or does not interfere with the sample plate P to be taken out from the plate storage 2.

Note that the structure of the plate stopper for preventing the falling of the sample plate P is not limited to the structure of the above-described example. For example, the rotating plate 28 of the plate stopper 24 of the above-described example may be driven by a motor. Alternatively, a sensor for detecting the opening and closing state of the opening and closing door 14 may be provided to operate the plate stopper 24 in conjunction with the opening and closing state of the opening and closing door 14. Alternatively, it may be configured such that a part of the plate stopper 24 comes into contact with the arm 16 when the arm 16 of the transport mechanism 4 enters in the plate storage 2 so that the plate stopper is moved from the interfering position to the non-interfering position in conjunction with the movement of the arm 16.

DESCRIPTION OF SYMBOLS

1: Plate changer
2: Plate storage
4: Transport mechanism
6: Housing
8: Plate installation stand 10: Installation window portion
12: Transport window portion
14: Opening and closing door
16: Arm
20, 22: Shaft
24: Plate stopper
26: Vertical bar
28: Rotating plate
30: Shaft
32: Torsion spring
34: Stopper
36: Shaft contacts
P: Sample plate

The invention claimed is:

1. A plate changer for an auto-sampler, comprising:
a plate storage provided with a plate installation stand for installing a sample plate thereon, an installation window portion for installing the sample plate on the plate installation stand by inserting the sample plate in one direction within a horizontal plane, and a transport window portion for taking out the sample plate installed on the plate installation stand in the one direction, the transport window portion being provided on an opposite side across the installation window portion via the plate installation stand; and
a transport mechanism provided with a gripping portion for gripping the sample plate, the transport mechanism being configured to transport the sample plate installed on the plate installation stand with the sample plate gripped by the gripping portion,
wherein the plate storage is provided with a plate stopper, the plate stopper being configured to be arranged at an interfering position where the plate stopper comes into contact with a transport window portion-side end face of the sample plate when the sample plate inserted from the installation window portion has reached a predetermined position in the one direction to stop the sample plate,
wherein the plate stopper is configured to be arranged at a non-interfering position where the plate stopper does not interfere with the gripping portion and the sample plate when the sample plate on the plate installation stand is taken out from the transport window portion by the gripping portion, and
wherein the plate stopper is provided with a vertical bar extending in a vertical direction and a rotating plate rotatable within a horizontal plane while holding one end of the vertical bar, the rotating plate being configured to rotate within the horizontal plane to move the vertical bar between the interfering position and the non-interfering position.

2. The plate changer as recited in claim 1,
wherein the plate stopper is provided with two rotating plates, and the rotating plates hold an upper end and a lower end of the vertical bar, respectively.

3. The plate changer as recited in claim 1, further comprising:
an opening and closing door for opening and closing the installation window portion,
wherein the vertical bar of the plate stopper is configured to be arranged at the interfering position when the opening and closing door is open and to be arranged at the non-interfering position when the opening and closing door is closed.

4. The plate changer as recited in claim 2, further comprising:
an opening and closing door for opening and closing the installation window portion,
wherein the vertical bar of the plate stopper is configured to be arranged at the interfering position when the opening and closing door is open and to be arranged at the non-interfering position when the opening and closing door is closed.

5. The plate changer as recited in claim 3, further comprising:
a shaft extending in the one direction, the shaft being configured to move toward the transport window portion in conjunction with a closing operation of the opening and closing door,
wherein the shaft is configured to move toward the transport window portion side when the opening and closing door is closed to push a portion of the rotating plate of the plate stopper to rotate the rotating plate so that the vertical bar is moved to the non-interfering position.

6. The plate changer as recited in claim 5,
wherein the rotating plate of the plate stopper is biased in a direction in which the vertical bar is arranged at the interfering position by an elastic body.

7. The plate changer as recited in claim 6,
wherein the elastic body is a torsion spring.

8. The plate changer as recited in claim 6, further comprising:
a stopper for stopping a rotating motion of the rotating plate such that the vertical bar stops with the vertical bar arranged at the interfering position in a state in which the rotating plate is not pressed by the shaft.

9. The plate changer as recited in claim 7, further comprising:
a stopper for stopping a rotating motion of the rotating plate such that the vertical bar stops with the vertical bar arranged at the interfering position in a state in which the rotating plate is not pressed by the shaft.

* * * * *